United States Patent Office 3,849,512
Patented Nov. 19, 1974

3,849,512
ISOPRENE PREPARED BY THE CATALYTIC DEHYDRATION OF 2-METHYL-2,3-BUTANEDIOL
William G. Bowman, Pasadena, Tex., assignor to Petro-Tex Chemical Corporation, Houston, Tex.
No Drawing. Filed Dec. 10, 1970, Ser. No. 96,975
Int. Cl. C07c 1/24
U.S. Cl. 260—681                        10 Claims

ABSTRACT OF THE DISCLOSURE

Neutral $Li_3PO_4$ is used to dehydrate 2-methyl-2,3-butanediol in a vapor phase process at about 375 to 425° C. by passing the diol vapors through a fixed bed of the catalyst to produce high yields of isoprene and isoprene precursors. The $Li_3PO_4$ can be employed with $ThO_2$ to give some improvement in the process. The two components are maintained in separate beds.

---

The present invention relates to a process for the dehydration of 2-methyl-2,3-butanediol to produce isoprene. More particularly the invention relates to the use of a lithium phosphate catalyst.

Natural rubber is a polymer of 2-methylbutadiene (isoprene). Natural rubber is a polymer in which the isoprene units are linked in the 1,4 manner and the groups on the double bond have cis configuration. In the early years of synthetic rubber development, great difficulty was experienced in duplicating the natural rubber configuration and styrene-butadiene-rubber came to fore dominating synthetic rubber production. Now catalysts and processes have been developed for producing superior synthetic polyisoprene, substantially duplicating natural rubber.

The expectations were that synthetic polyisoprene would displace SBR since it is a generally superior and more desirable synthetic rubber than SBR. However, isoprene availability became a problem. Numerous methods of isoprene production have been proposed, e.g., the pyrolysis of terpene hydrocarbons, dehydrogenation of isopentane isopentene, catalytic pyrolysis of ethylenically unsaturated ether, synthesis and dehydration of dimethyl vinylcarbinol and dehydration of 2-methyl-2,3-butanediol.

Each method has substantially deficiencies, for example, dehydrogenation of isopentane, or isopentene is subject to a rather non-selective reaction with the present state of the art.

The dehydration of 2-methyl-2,3-butanediol has always been considered unattractive because of the difficulty of producing the diol, however, recent technological advances in this area have entirely reversed this situation and the production of 2-methyl-2,3-butanediol in large economical quantities is possible.

It has now been found that 2-methyl-2,3-butanediol can be converted to isoprene in good yields by using a substantially neutral lithium phosphate catalyst.

The process is vapor phase carried out at temperatures in the range of 200 to 500° C., preferably around 350 to 450° C. and usually in the range of about 375 to 425° C. The process is generally carried out at atmospheric pressure but may be practiced at either sub or super atmospheric pressures. The 2-methyl-2,3-butanediol is passed through a reactor containing a $Li_3PO_4$ catalyst. Usually the vaporous diol feed is mixed with a vaporous or gaseous diluents. Suitable diluent includes helium, nitrogen, argon, other inert gases, hydrogen, steam or mixtures thereof. The diluent is usually present in an amount of about 0.5 to 20 moles per mole of diol and more generally about 1 to 10 moles per mole of diol.

The contact time of the feed with the catalyst is about 1 to 6 seconds. Since the process is carried out by passing a vaporous feed through the catalyst bed it is convenient to express the contact time by means of the flow rate in terms of liquid volume of diol to be dehydrated per volume of dehydration zone containing catalyst per hour (referred to as LHSV). The optimum flow rates will be dependent upon such variables as temperature of the reaction, presure, particle size and so forth. Usually, the LHSV will be between .5 and about 4. For calculation, the volume of a fixed bed dehydration zone containing catalyst is that original void volume of reactor space containing catalyst.

The $Li_3PO_4$ catalyst can be prepared by reacting lithium hydroxide and phosphoric acid. The resulting salt can be adequately washed to provide a catalyst which is substantially neutral, i.e., pH of approximately 7.2 or the pH can be adjusted during the precipitation. It has been found that neither basic or acid $Li_3PO_4$ are nearly as suitable as neutral salt.

In a particular embodiment it has been found that a bed of $Li_3PO_4$ combined with a bed of thorium oxide (thoria) produces an enhanced effect. The catalysts are maintained in separate beds. The order of the beds is not critical although the use of $Li_3PO_4$ as the final bed seems to offer some advantage. The ratio of catalyst surface of $Li_3PO_4$ to $ThO_2$ is about 10:1 to 1:10 and more preferably about 3:1 to 1:2.

The catalysts may be pelleted and used as such or may be deposited on or in carriers such as pumice, graphite, silica, alumina, silica-alumina, fullers earth, firebrick and the like. The carriers should be neither basic nor strongly acidic.

The catalyst can be employed in a fixed or moving bed such as a fluidized bed. In the case of a two component system the various catalyst beds should be kept separate. Ordinary and conventional equipment and techniques used for dehydrations or dehydrogenations can be used for this process. Those skilled in the area of process design will readily be able to select suitable equipment.

The following examples will illustrate the invention as described above. Conversions, selectivities and yields are in mole percent, all other percentages are by weight unless specified otherwise.

The runs were made in a downflow Vycor 750 x 25 mm. O.D. reactor heated with an electric furnace. Vycor Rachig (6 x 6 mm.) rings were placed above and below the catalyst bed to preheat feed and position the catalyst. Gas chromatography was used to identify the products by the internal standard method using pentene-1.

EXAMPLES

Catalyst Preparation $Li_3PO_4$.—To 50 mls. of the carrier was added 2.90 g. of $LiOH.H_2O$ dissolved in 50 mls. of $H_2O$. $H_3PO_4$ was added to pH 6.5. $LiOH.H_2O$ was added to pH 7.2. The slurry was evaporated with agitation in a Vycor dish.

$ThO_2$.—100 g. of $Th(NO_3)_4$ $4H_2O$ was dissolved in 3.5 liters of hot $H_2O$. 12.6 g. of oxalic acid plus 50 mls. of $H_2O_3$ in 500 mls. of $H_2O$ were slowly added to the $Th(NO_3)_4$ solution. The precipitate was washed 8 times by decanting and adding additional $H_2O$. The residue was filtered and heated to 375° C. overnight. The cake was broken up carefully and screened to ⅛" x ⅛" size.

$Li_2HPO_4$.—14.75 g. of $LiOH.H_2O$ was dissolved in 75 mls. of $H_2O$ and mixed with 57.4 g. (50 mls.) AMC carrier in Vycor disk. 20.9 g. of 85% $H_3PO_4$ was then added. The resulting slurry was dried with constant stirring.

$LiH_2PO_4$.—Same as above except as follows: $LiOH.H_2O$ 7.37 g. $H_3POR$ 20.29 g. of 85%. AMC carrier 57.4 g. (50 mls.).

The Process

In each of these examples 50 ml. of catalyst was employed in the described reactor. The feed was 2-methyl-2,3-butanediol diluted with 10% $H_2O$ (mole ratio $H_2O$/diol=0.6:1). The runs were made at atmospheric pressure. The Table contains the particular catalyst (catalyst support materials in Examples 17 to 20) and the other conditions of the run as well as the results. Each run was approximately 14 to 30 minutes in duration depending on the rate at which the diol was fed.

TABLE

Dehydration catalysts results

| Ex. | Catalyst composition | Diols fed, moles | Contact time, seconds | LHSV | Gaseous diluent | Temperature, °C | Percent conversion | Product yield, mole percent | | | | Percent selectivity to isoprene and precursors |
|---|---|---|---|---|---|---|---|---|---|---|---|---|
| | | | | | | | | Isoprene | 3-methyl-2,3-butanoxide | 3-methyl-3 butene-2-ol | Methyl isopropyl ketone | |
| 1 | $Li_3PO_4$ on 6 x 6 mm. Vycor Raschig Rings. | 0.26 | 2.3 | 2.2 | $H_2$ | 425 | 98.5 | 63.8 | 4.5 | 7.2 | 22.4 | 76.6 |
| 2[1] | do | 0.25 | 2.2 | 2.3 | $H_2$ | 425 | 92.2 | 44.1 | 4.4 | 12.2 | 19.8 | 65.8 |
| 3 | $ThO_2$, 1.8 solid cake | 0.25 | 2.2 | 2.2 | $H_2$ | 390 | 98.4 | 1.5 | 2.0 | 72.5 | 11.4 | 77.2 |
| 4 | $Li_3PO_4$ on AMC[2] | 0.25 | 2.2 | 2.2 | He | 425 | >99.0 | 48.2 | 11.3 | 6.1 | 25.2 | 65.6 |
| 5 | $Li_3PO_4$ on AMC[3] | 0.25 | 2.2 | 2.2 | $H_2$ | 425 | >99.0 | 22.5 | 19.0 | 1.0 | 53.0 | 42.5 |
| 6 | $Li_3PO_4$ FMC on AMC[2 4] | 0.25 | 2.2 | 2.2 | He | 425 | 42.7 | 2.0 | 10.6 | 8.2 | 17.7 | 48.7 |
| 7 | $Li_3PO_4$ on AMC[5] | 0.42 | 2.4 | 2.3 | $H_2$ | 425 | 99.0 | 51.9 | 12.0 | 6.6 | 21.7 | 70.5 |
| 8 | $Li_2HPO_4$ on AMC[5] | 0.252 | 2.2 | 2.2 | $H_2$ | 425 | 38.0 | 5.9 | 1.6 | 9.1 | 10.3 | 43.7 |
| 9 | $LiH_2PO_4$ on AMC[5] | 0.256 | 2.2 | 2.2 | $H_2$ | 425 | 91.0 | 21.9 | 7.7 | 11.3 | 45.0 | 44.9 |
| 10 | $Li_2O$ on AMC[5] | 0.26 | 2.2 | 2.2 | He | 425 | 36.3 | 0.73 | 7.1 | 4.2 | 5.4 | 33.1 |
| 11 | Lithium bromide on AMC[5] | 0.26 | 2.2 | 2.2 | He | 425 | 76.6 | 2.2 | <1.0 | 9.2 | 52.8 | 15.0 |
| 12[6] | $ThO_2$-50 mls, $Li_3PO_4$ on BS131-50 mls.[7] | 0.26 | 4.4 | 1.1 | $H_2$ | 425 | >99.0 | 51.4 | 3.3 | 3.7 | 23.9 | 58.4 |
| 13[6] | do[7] | 0.42 | 4.4 | 1.1 | $H_2$ | 425 | >99.0 | 64.8 | 3.8 | 7.0 | 14.8 | 74.8 |
| 14[6] | do[7] | 0.42 | 4.4 | 1.1 | $H_2$ | 425 | >99.0 | 38.4 | 6.3 | 16.9 | 21.1 | 61.6 |
| 15[6] | do[7] | 0.42 | 4.4 | 1.1 | $H_2$ | 425 | >99.0 | 55.5 | 6.4 | 8.9 | 19.9 | 70.8 |
| 16 | Same as Ex. 12 but intimate mixed bed. | 0.42 | 4.4 | 1.1 | $H_2$ | 425 | >99.0 | 28.7 | 11.8 | 4.9 | 45.2 | 45.4 |
| 17 | Vycor Raschig R. 6 x 6 mm | 0.26 | 2.4 | 2.2 | $H_2$ | 425 | 13.0 | <0.1 | 1.0 | 0.1 | 2.0 | 8.5 |
| 18 | Quartz chips | 0.26 | 2.4 | 2.2 | $H_2$ | 425 | 11.0 | 0.5 | 0.1 | 0.6 | 0.1 | 10.9 |
| 19 | BS131, silica[8] | 0.26 | 2.4 | 2.2 | $H_2$ | 425 | >99.0 | 15.6 | <0.1 | <0.1 | 71.1 | 15.6 |
| 20 | AMC[5 9] | 0.26 | 2.4 | 2.2 | $H_2$ | 425 | 98.5 | 10.1 | 24.1 | 3.1 | 53.2 | 37.9 |

[1] Second run, same catalyst, no regeneration.
[2] HCl leached and calcined at 700° C.
[3] HCl leached, dried, but not calcined.
[4] $Li_3PO_4$ obtained from FMC Corp. pH was about 8.0.
[5] Untreated AMC 7/9 mesh.
[6] Four consecutive runs; same catalyst charge prior to fourth run (Example 15) catalyst regenerated at 550° C. in air for 120 minutes.
[7] Two layers, $ThO_2$ contacted the diol first.
[8] Low surface area silica.
[9] Low surface area alumina-silica.

Referring to the Table it should be noted that since isoprene is the desired product a high yield of isoprene indicates a preferred system, however, note also that a high selectivity to isoprene and isoprene precursors even in the face of low isoprene yields indicate a suitable process since the precursors can be separated from the isoprene and recycled to the process. Examples 1 and 2 represent a preferred system. Example 4 also is a preferred system, whereas Examples 5 and 6 represent non-neutral systems in that the support in Example 5 was leached with HCl but not calcined (leaving a strongly acid system) and the $Li_3PO_4$ of Example 6 was alkaline (pH 8.0). Example 7 however, represents a neutral $LiPO_4$ system and gives excellent overall results. Example 3 shows that $ThO_2$ alone performs poorly in regard to the yield of isoprene and would require a great deal of recycling to obtain suitable production.

Examples 8 and 9 show the relatively poor results with lithium acid phosphates. Examples 10 and 11 show the use of other lithium compounds to be totally unsuitable.

Examples 12–15 show the use of two beds of catalyst ($ThO_2$ and $Li_3PO_4$) in 4 continuous runs. There is a drop in the effectiveness of the catalyst in the third continuous run (Example 14) which is substantially overcome by regenerating the catalyst (burning off coke) with air at 550° C. for 120 minutes, prior to the fourth run (Example 15). Example 16 shows the same catalyst system but with the two components intermingled. The results are relatively poorer.

Examples 17–20 demonstrate the effect of some supports alone.

The invention claimed is:

1. A process for the dehydration of 2-methyl-2,3-butanediol consisting essentially of contacting 2-methyl-2,3-butanediol in the vapor phase with a catalyst at a temperature in the range of 200 to 500° C., said catalyst being thorium oxide and lithium phosphate in which the lithium phosphate has a substantially neutral pH and wherein the thorium oxide and lithium phosphate are maintained separate and distinct from each other, in discrete beds, said 2-methyl-2,3-butanediol contacting said thorium oxide bed first and then subsequently contacting said lithium phosphate.

2. The process according to claim 1 wherein the temperature is in the range of 350 to 450° C.

3. The process according to claim 2 wherein the temperature is in the range of 375 to 475° C.

4. The process according to claim 2 wherein said 2-methyl-2,3-butanediol contacting said catalyst contains a vaporous, inert diluent in a mole ratio of diluent to 2-methyl-2,3-butanediol of about 0.5:1 to 20:1.

5. The process according to claim 4 wherein the mole ratio of diluent to diol is about 1:1 to 10:1.

6. The process according to claim 2 wherein the ratio of surface of $Li_3PO_4$ to $ThO_2$ is about 10:1 to 1:10.

7. The process according to claim 2 wherein the $Li_3PO_4$ is deposited on a carrier selected from the group consisting of pumice, graphite, silica, alumina, silicate-alumina, fullers earth and firebrick.

8. The process according to claim 7 wherein a vaporous diluent is present in a mole ratio of diluent to diol of about 1:1 to 10:1.

9. The process according to claim 6 wherein the temperature is in the range of 350 to 450° C., and a vaporous diluent is present in a mole ratio of diluent to diol of about 1:1 to 10:1.

10. The process according to claim 9 wherein the $Li_3PO_4$ is deposited on a carrier selected from the group consisting of pumice, graphite, silica, alumina, silica-alumina, fullers earth and firebrick.

References Cited

UNITED STATES PATENTS

| | | | |
|---|---|---|---|
| 3,758,612 | 9/1973 | Maurin | 260—681 |
| 3,647,903 | 3/1972 | Maurin | 260—681 |
| 3,510,537 | 5/1970 | Sheng et al. | 260—681 |
| 3,391,213 | 7/1968 | Fetterly | 260—681 |
| 2,986,585 | 5/1961 | Denton | 260—681 |
| 1,923,569 | 8/1933 | Mueller-Cunradi | 260—681 |
| 1,944,153 | 1/1934 | Mueller-Cunradi | 260—681 |
| 2,204,157 | 6/1940 | Semon | 260—681 |

DELBERT E. GANTZ, Primary Examiner

VERONICA O'KEEFE, Assistant Examiner

PO-1050
(5/69)

UNITED STATES PATENT OFFICE
CERTIFICATE OF CORRECTION

Patent No. 3,849,512      Dated November 19, 1974

Inventor(s) William G. Bowman

It is certified that error appears in the above-identified patent and that said Letters Patent are hereby corrected as shown below:

Col. 2, line 7 reads "presure" but should read --- $pressure_{2,4}$ ---.
Col. 3, Example 6 reads "$AMC^{24}$" but should read --- $AMC_{5,9}$ ---.
Col. 3, Example 20 reads "$AMC^{59}$" but should read --- $AMC^{5,9}$ ---.

Signed and sealed this 8th day of April 1975.

(SEAL)
Attest:

RUTH C. MASON
Attesting Officer

C. MARSHALL DANN
Commissioner of Patents
and Trademarks